(12) United States Patent
Susitaival et al.

(10) Patent No.: US 8,462,803 B2
(45) Date of Patent: Jun. 11, 2013

(54) DISCONTINUOUS RECEPTION (DRX) TIMER TRIGGERED WITH THE TRANSMISSION OF A BUFFER STATUS REPORT (BSR)

(75) Inventors: Riikka Susitaival, Helsinki (FI); Magnus Lindstrom, Spanga (SE); Ghyslain Pelletier, Boden (SE); Anna Larmo, Espoo (FI)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 284 days.

(21) Appl. No.: 12/936,100

(22) PCT Filed: Dec. 8, 2008

(86) PCT No.: PCT/SE2008/051423
§ 371 (c)(1),
(2), (4) Date: Oct. 1, 2010

(87) PCT Pub. No.: WO2009/136830
PCT Pub. Date: Nov. 12, 2009

(65) Prior Publication Data
US 2011/0026625 A1    Feb. 3, 2011

Related U.S. Application Data

(60) Provisional application No. 61/051,349, filed on May 7, 2008.

(51) Int. Cl.
*H04L 12/28* (2006.01)
*H04J 3/16* (2006.01)
*H04W 4/00* (2009.01)

(52) U.S. Cl.
USPC .......................... 370/412; 370/468; 370/329

(58) Field of Classification Search
USPC .................... 370/468, 328, 329, 395.21, 338, 370/352, 409, 410, 412, 413; 714/746–749, 714/750; 455/450, 451, 452, 524, 525, 509
See application file for complete search history.

(56) References Cited

U.S. PATENT DOCUMENTS

2008/0192674 A1* 8/2008 Wang et al. .................. 370/315
2008/0198795 A1* 8/2008 Kim et al. .................... 370/328
2009/0232118 A1* 9/2009 Wang et al. .................. 370/338

FOREIGN PATENT DOCUMENTS

JP    2003-037874 A    2/2003
JP    2009-165134 A    7/2009
(Continued)

OTHER PUBLICATIONS

International Search Report, PCT Application No. PCT/SE2008/051423, Apr. 15, 2009.

(Continued)

*Primary Examiner* — Hanh N Nguyen
(74) *Attorney, Agent, or Firm* — Myers Bigel Sibley & Sajovec, P.A.

(57) ABSTRACT

A method implemented at a user equipment (UE) may include receiving a grant from a base station permitting the user equipment to transmit data to the base station and transmitting data to the base station, where the data includes a buffer status report (BSR) that indicates an amount of data in a buffer of the UE. The method may further include starting or restarting a discontinuous reception (DRX) timer when the data including the BSR is transmitted to the base station. The method may additionally include monitoring (730) a control channel during a duration of the DRX timer. In another implementation, a method may include receiving a feedback message in response to the data transmission including the BSR, and starting or restarting the discontinuous reception (DRX) timer when the feedback message is received. The feedback message may include an acknowledgement (ACK) or a negative acknowledgement (NACK). In a further implementation, a method may include starting a process specific hybrid automatic repeat request (HARQ) round trip time (RTT) timer upon transmission of the data including the BSR, starting a grant timer when the HARQ RTT timer expires, and monitoring the control channel during a duration of the grant timer.

6 Claims, 16 Drawing Sheets

FOREIGN PATENT DOCUMENTS

| | | |
|---|---|---|
| JP | 2009-171580 A | 7/2009 |
| WO | WO 2007/139188 A1 | 12/2007 |

OTHER PUBLICATIONS

International Preliminary Report on Patentability; PCT/SE2008/051423; Jul. 6, 2010.

Ericsson: "Correction on UE behavior for DRX for Regular BSR" 3GPP TSG-RAN2 Meeting #62; R2-083151; Jun. 2008, pp. 1-4. Warsaw, Poland.

Samsung: "DRX operation during UL transmission" 3GPP TSG-RAN2 Meeting #61; Tdoc R2-080822; Feb. 2008, pp. 1-4. Sorrento, Italy.

Samsung: "Open issues on DRX" 3GPP TSG-RAN2 Meeting #60bis; Tdoc R2-080165; Jan. 2008, pp. 1-5. Sevilla, Spain.

ETSI TS 136 300 "Evolved Universal Terrestrial Radio Access (E-UTRA) and Evolved Universal Terrestrial Radio Access (E-UTRAN)" Overall description; Stage 2 (3GPP TS 36.300 version 8.4.0 Release 8); Apr. 2008, pp. 1-130; Sophia Antipolis, France.

3GPP TS 36.321 "$3^{rd}$ Generation Partnership Project; Technical Specification Group Radio Access Network; Evolved Universal Terrestrial Radio Access (E-UTRA) Medium Access Control (MAC) protocol specification" (Release 8); Mar. 2008, pp. 1-30; Valbonne, France.

Zhang et al. "Enhanced Wireless Transmit Receive Unit Procedure for Coordinated Uplink Transmission in LTE DRX Operations" U.S. Appl. No. 61/036,527, filed Mar. 14, 2008, 18 pages.

3GPP TS36.321 V8.1.0, Evolved Universal Terrestrial Radio Access (E-UTRA) Medium Access Control (MAC) protocol specification, Mar. 20, 2008, 35 Pages.

3GPP TSG- RAN2 Meeting #62, R2-083151, 36.321CR, Warsaw, Poland, Jun. $30^{th}$-$4^{th}$, 2008, NPL-11-003248, 4 Pages.

Japanese Office Action Corresponding to Japanese Patent Application No. 2011-508439; Dated: Apr. 2, 2013; Foreign Text, 2 pages, Engish Translation Thereof, 3 pages.

* cited by examiner

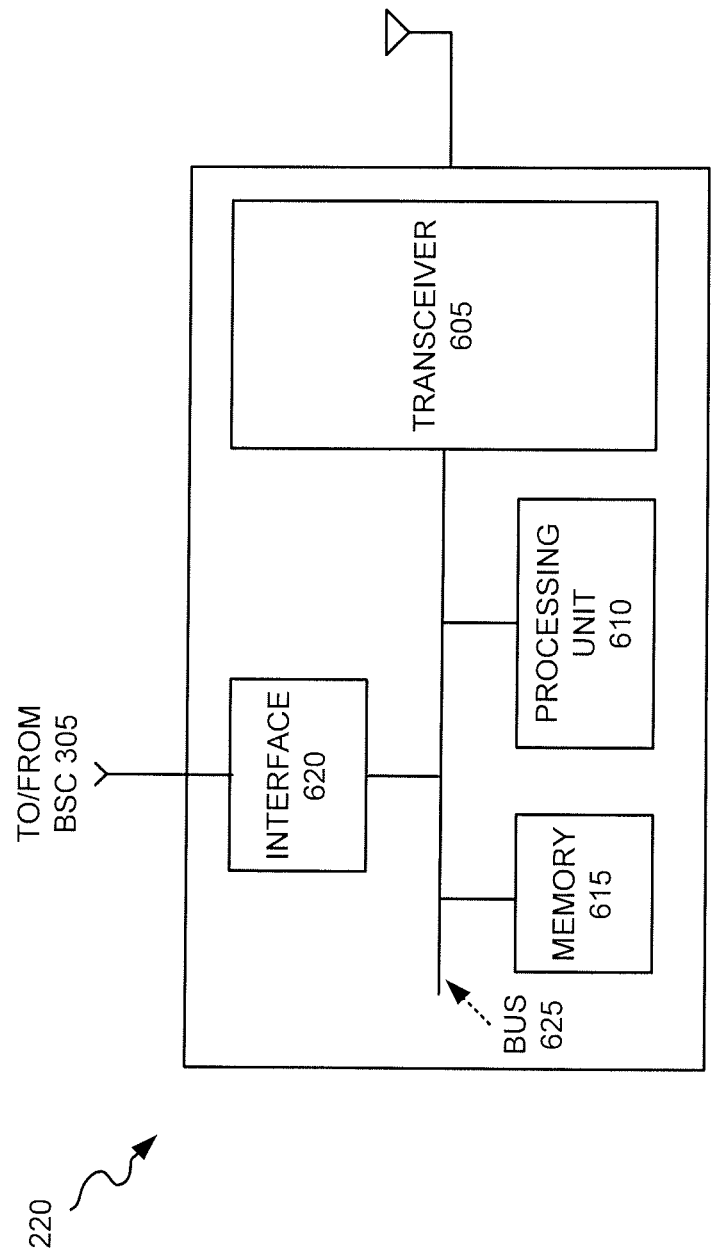

DISCONTINUOUS RECEPTION (DRX) TIMER TRIGGERED WITH THE TRANSMISSION OF A BUFFER STATUS REPORT (BSR)

CROSS REFERENCE TO RELATED APPLICATION

This application is a 35 U.S.C. §371 national stage application of PCT International Application No. PCT/SE2008/051423, filed on 8 Dec. 2008, which itself claims priority to U.S. provisional patent Application No. 61/051,349, filed 7 May 2008, the disclosures and contents of which are incorporated by reference herein in their entirety. The above-referenced PCT International Application was published in the English language as International Publication No. WO 2009/136830 A1 on 12 Nov. 2009.

TECHNICAL FIELD

Implementations described herein relate generally to wireless systems, and more particularly, to discontinuous reception (DRX) in wireless systems.

BACKGROUND

The 3$^{rd}$ Generation Partnership Project (3GPP) is a globally applicable third generation mobile phone system specification that is a result of collaboration between various groups of telecommunications associations, including the European Telecommunications Standards Institute, the Association of Radio Industries and Businesses/Telecommunication Technology Committee (ARIB/TTC), China Communications Standards Association, and the Alliance for Telecommunications Industry Solutions. 3GPP work is ongoing with Universal Terrestrial Radio Access Network (UTRAN) long term evolution (LTE). The 3GPP RAN2 working group has defined a Discontinuous Reception (DRX) mechanism to save battery life and resources of user equipment (UE). The main principle in DRX is that the user equipment (UE) behavior is defined relative to the successful decoding of the Physical Downlink Control Channel (PDCCH) by the UE. When the UE is in DRX, the UE is allowed to stop monitoring the PDCCH. DRX uses one or two pre-defined cycles (long and/or short cycles), at the beginning of which the UE monitors the PDCCH over a certain amount of transmission time intervals (TTIs), according to an "On Duration" Timer. The PDCCH carries downlink (DL) assignments as well as uplink (UL) grants.

Whether the UE is awake (e.g., is monitoring the PDCCH) or asleep after the On Duration period, depends on activity (i.e., possible reception of PDCCH control data during the period). To avoid unnecessary scheduling and to avoid wasting of radio resources, the base station (e.g., eNodeB) should know the state of the UE when transmitting downlink data from the base station to the UE. Thus, a set of clear rules for changing from the active state to DRX and back are defined in 3GPP Technical Specification (TS) 36.321, "Medium Access Control (MAC) Specification."

In LTE, the characteristics of the DRX scheme for the UL include the following:

1) the UE can be configured with a Short DRX cycle, which is a full fraction of the (Long) DRX cycle (i.e., Long DRX=x*Short DRX).

2) On Duration Timer in the beginning of each cycle defines how long the UE should monitor PDCCH. There are two types of cycles, long and short.

3) if only UL traffic exists, the UE should monitor PDCCH if
   a) On Duration Timer is running;
   b) DRX Inactivity timer is running;
   c) a scheduling request (SR) is pending. SR is considered to be pending from the triggering of a SR until the receiving of any grant;
   d) a grant for retransmission can arrive. Assuming synchronous hybrid automatic repeat request (HARQ) on the UL, retransmission can occur after 8 ms of the previous transmission;

4) if PDCCH indicates UL transmission for new data, the UE should start or restart a DRX Inactivity Timer. When the inactivity timer expires, the UE should start to use the short cycle if it is configured. Use of the short cycle is stopped when the Short DRX Cycle Timer is expired. A typical DRX pattern with only long cycles is illustrated in FIG. 1. As shown in FIG. 1, the UE first sends a scheduling request (SR) to a base station (BS) and then monitors the PDCCH until the initial grant is received as a response to the SR. Using the received grant, the UE sends a regular buffer status report (BSR) of existing data in the buffer. Finally, after receiving a new grant, the UE can send actual data. The BS and the UE have similar inactivity timers and knowledge of the beginning times of the long cycles and, thus, the state of the UE does not have to be signaled explicitly between the BS and UE.

In order to ensure that the UE is listening on the PDCCH when an UL grant, as a response to a reported buffer status report, will arrive, either 1) the length of the inactivity timer is very long, or 2) the grants for new data are transmitted at a subframe when the possible retransmission would occur if there had been a negative decoding result. Otherwise, the grant for new data is delayed until the next DRX cycle. If only long cycles are configured this would result in an unnecessarily long delay. However, having a very long inactivity timer is not desirable, because then there are not many opportunities for the UE to enter a sleep mode. The battery consumption of the UE would be high and there would not be any significant benefit to have the DRX at all. In addition, if there are retransmissions for the HARQ transmission having a BSR, the inactivity timer would be even much longer than 10 milliseconds (ms). For the downlink, the best performance of DRX is achieved with a short inactivity timer of a few subframes. If the UL requires a very long inactivity timer, this would decrease the performance of DRX with DL traffic. Also, constraining the possible grants for those subframes that are synchronized with 8 ms HARQ RTT time is not desirable. Having such a constraint would make scheduling more complicated and inefficient.

SUMMARY

Exemplary embodiment described herein improve DRX behavior as a response to uplink scheduling requests and buffer status reports by implementing changes in DRX in such a way that new grants of UL traffic can be detected with a shorter inactivity timer, thereby achieving a smaller delay and/or decreased battery consumption. In one exemplary embodiment described herein, the UE may start/restart the inactivity timer if the UE transmits or retransmits a data unit (e.g., a MAC PDU) that includes a BSR. In a further exemplary embodiment described herein, the UE may also start/restart the inactivity timer when the UE receives HARQ feedback (e.g., ACK or NACK) for uplink transmission of a data unit (e.g., a MAC PDU) that contains a BSR. In an additional exemplary embodiment described herein, the UE may start/restart the inactivity timer when the UE receives HARQ feedback for a previous transmission, if that transmission includes a data unit (e.g., a MAC PDU) containing a BSR having more than a certain number of bits (e.g., more than 0 bits). In yet another exemplary embodiment described herein, the UE may start a HARQ round trip time (RTT) timer when receiving a grant for old or new data. When the HARQ RTT timer expires, the UE starts a grant timer for a given time period and monitors PDCCH during the grant timer.

According to one aspect, a method implemented at a user equipment (UE) may include receiving a grant from a base station permitting the user equipment to transmit data to the base station and transmitting data to the base station, where the data includes a buffer status report (BSR) that indicates an amount of data in a buffer of the UE. The method may further include starting or restarting a discontinuous reception (DRX) timer when the data including the BSR is transmitted to the base station.

According to a further aspect, a computer-readable medium containing instructions executable by at least one processing device may include one or more instructions for receiving a grant from a base station permitting a user equipment (UE) to transmit data to the base station. The computer-readable medium may further include one or more instructions for initiating transmission of data to the base station, where the data includes a buffer status report (BSR) that indicates an amount of data in a buffer of the UE, and one or more instructions for receiving a feedback message in response to the data transmission including the BSR. The computer-readable medium may also include one or more instructions for starting or restarting a discontinuous reception (DRX) timer when the feedback message is received.

According to another aspect, a user equipment (UE) may include a buffer that stores data for transmission and a control unit. The control unit may be configured to: receive a grant from a base station permitting the UE to transmit data to the base station, initiate transmission of the data to the base station, where the data includes a buffer status report (BSR) that indicates an amount of data in the buffer, start a process specific hybrid automatic repeat request (HARQ) round trip time (RTT) timer upon transmission of the data including the BSR, start a grant timer when the HARQ RTT timer expires, and monitor a control channel during a duration of the grant timer.

BRIEF DESCRIPTION OF THE DRAWINGS

FIG. 6 illustrates exemplary components of the base station of FIG. 2;

DETAILED DESCRIPTION

The following detailed description of the invention refers to the accompanying drawings. The same reference numbers in different drawings may identify the same or similar elements. Also, the following detailed description does not limit the invention.

In existing DRX mechanisms for LTE, the grant for UE transmission of new data to the base station does not necessarily arrive very soon after a previous grant. For example, if there are HARQ retransmissions, it can take over 40 ms before the base station (e.g., eNodeB) is able to decode the buffer status report from the UE. Exemplary embodiments described herein implement changes in DRX in such a way that new grants of UL traffic can be detected with shorter inactivity timers, thereby, achieving a smaller delay and/or decreased battery consumption. A "DRX Inactivity timer," as referred to herein, specifies a number of consecutive transmission time intervals (TTIs) during which a UE monitors the PDCCH after successfully decoding a PDCCH indicating an initial uplink (UL) or downlink (DL) user data transmission for this UE.

Figure 1:
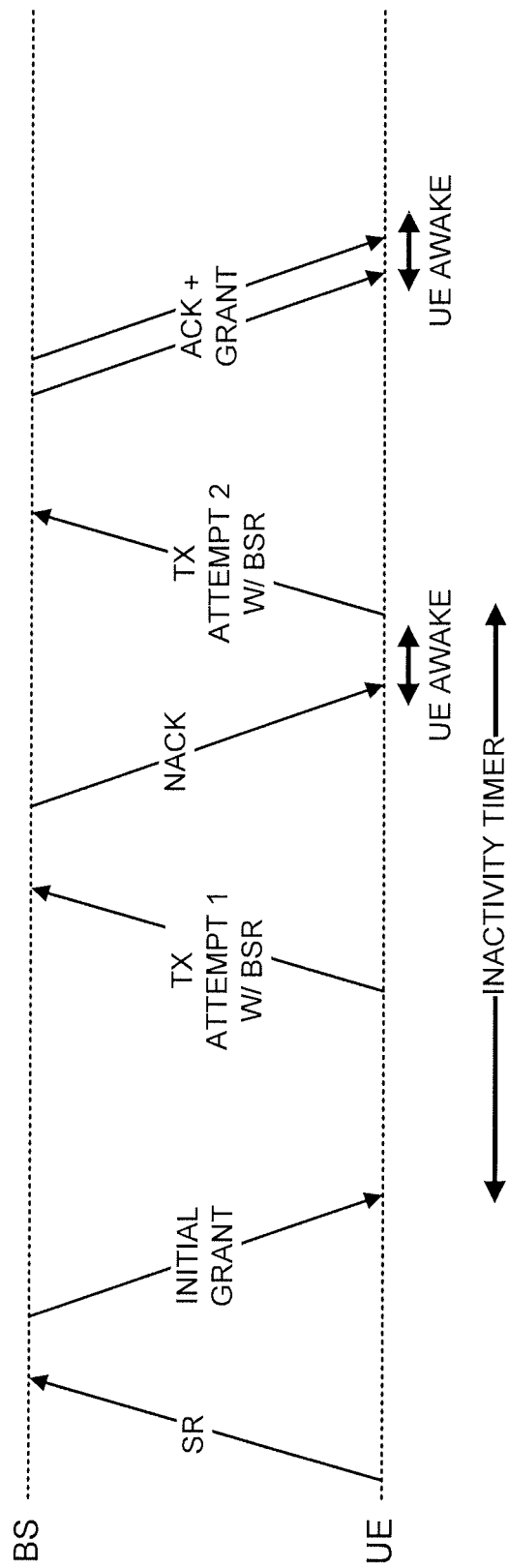
FIG. 1 illustrates discontinuous reception at a UE according to existing techniques.
Figure 2:
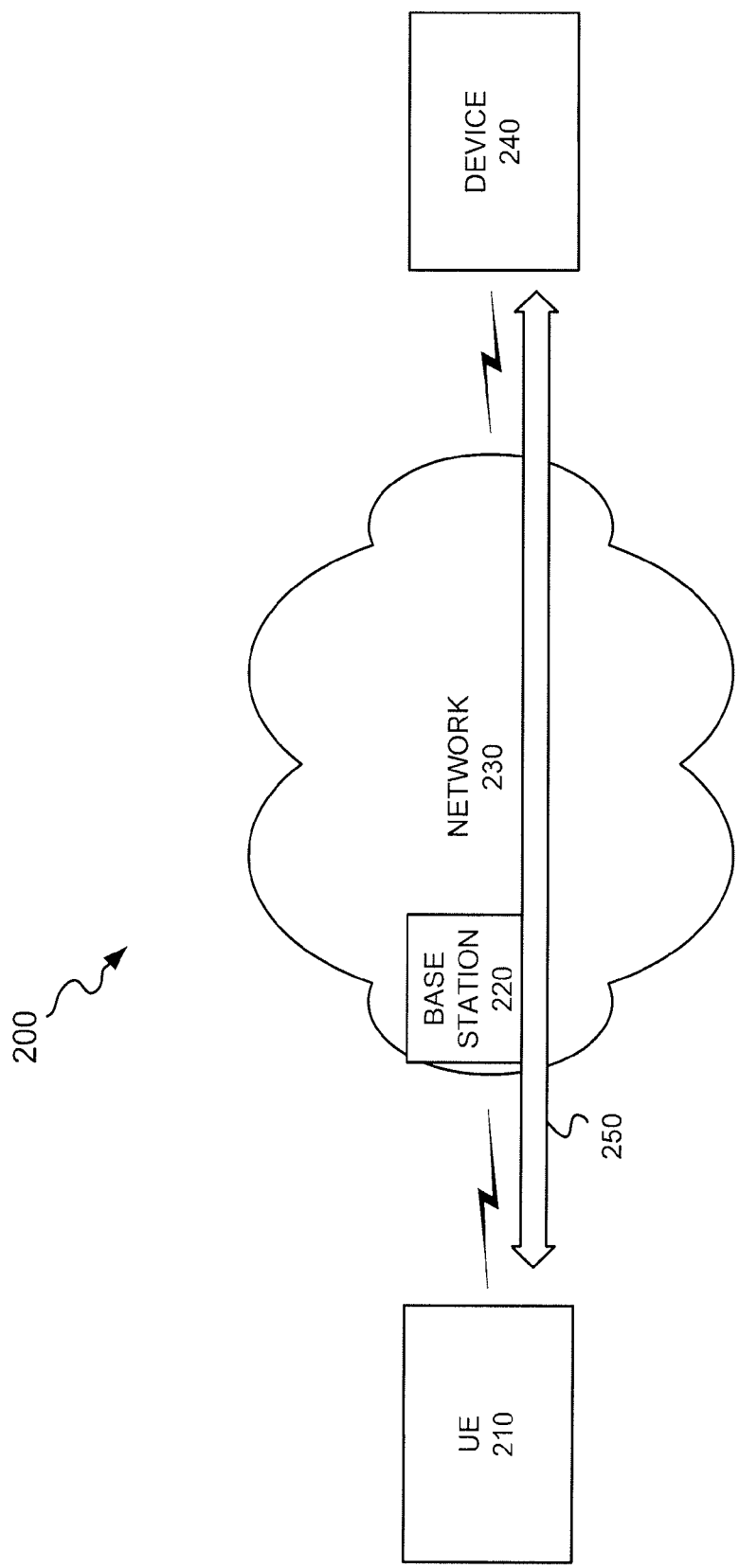
FIG. 2 illustrates two devices communicating with one another via a network.

FIG. 2 illustrates two devices communicating with one another in a networked environment 200. As shown in FIG. 2, user equipment (UE) 210 may communicate with device 240 via a network 230. In one implementation, UE 210 may communicate with device 240 via a base station 220 that acts as an intermediate device between UE 210 and device 240. For example, as shown in FIG. 2, base station 220 may reside as an intermediate component of network 230 and may be used to facilitate end-to-end communication between UE 210 and device 240. Devices 210 and 240 may be generically referred to herein as "user equipment" (UE).

Each of devices 210 and 240 may include a mobile UE such as a cellular radiotelephone, a personal digital assistant (PDA), a Personal Communications Systems (PCS) terminal, a laptop computer, a palmtop computer, or any other type of device or appliance that includes a communication transceiver that permits the device to communicate with other devices via a wireless link. A PCS terminal may combine a cellular radiotelephone with data processing, facsimile and data communications capabilities. A PDA may include a radiotelephone, a pager, an Internet/intranet access device, a web browser, an organizer, calendars and/or a global positioning system (GPS) receiver. One or more of devices 210 and 240 may be referred to as a "pervasive computing" device. Base station 220 may, in one implementation, include a base station of a Public Land Mobile Network (PLMN).

Network(s) 230 may include one or more networks of any type, including, for example, a local area network (LAN); a wide area network (WAN); a metropolitan area network (MAN); a telephone network, such as the Public Switched Telephone Network (PSTN) or a PLMN; a satellite network; an intranet, the Internet; or a combination of networks. The PLMN(s) may further include a packet-switched network, such as, for example, a General Packet Radio Service (GPRS) network, a Cellular Digital Packet Data (CDPD) network, or a Mobile IP network.

Figure 3:
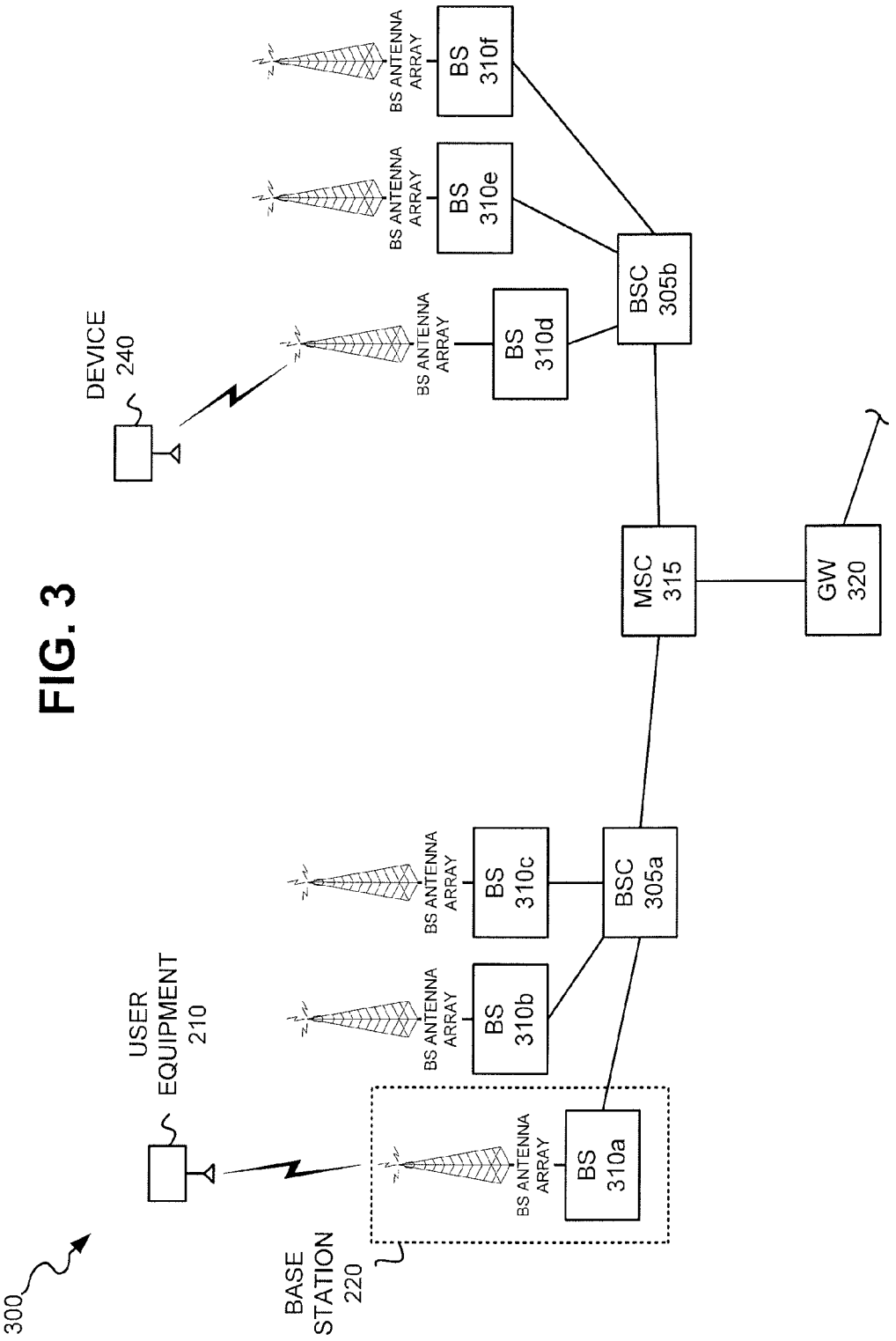
FIG. 3 illustrates an exemplary implementation in which a base station in a wireless network acts as an intermediate device to enable a UE to communicate with another UE or other communication devices.

FIG. 3 illustrates an example of network 230 of FIG. 2, where network 230 includes a PLMN 300. As shown in FIG. 3, base station 220 may include a base station of the PLMN 300 and devices 210 and 240 may include cellular radiotelephones that are communicating with one another via PLMN 300.

PLMN 300 may include one or more base station controllers (BSCs) 305a and 305b (alternatively called "radio network controllers" (RNCs) in some implementations), multiple base stations (BSs) 310a-310f, along with their associated antenna arrays, one or more mobile switching centers (MSCs), such as MSC 315, and one or more gateways (GWs), such as GW 320.

Base stations 310a-310f may format the data transmitted to, or received from, the antenna arrays in accordance with existing techniques and may communicate with BSCs 305a and 305b or a device, such as device 210. Among other functions, BSCs 305a and 305b may route received data to either MSC 315 or a base station (e.g., BSs 310a-310c or 310d-310f). MSC 315 may route received data to BSC 305a or 305b. GW 320 may route data received from an external domain (not shown) to an appropriate MSC (such as MSC 315), or from an MSC to an appropriate external domain. For example, the external domain may include the Internet or a PSTN.

Figure 4A:
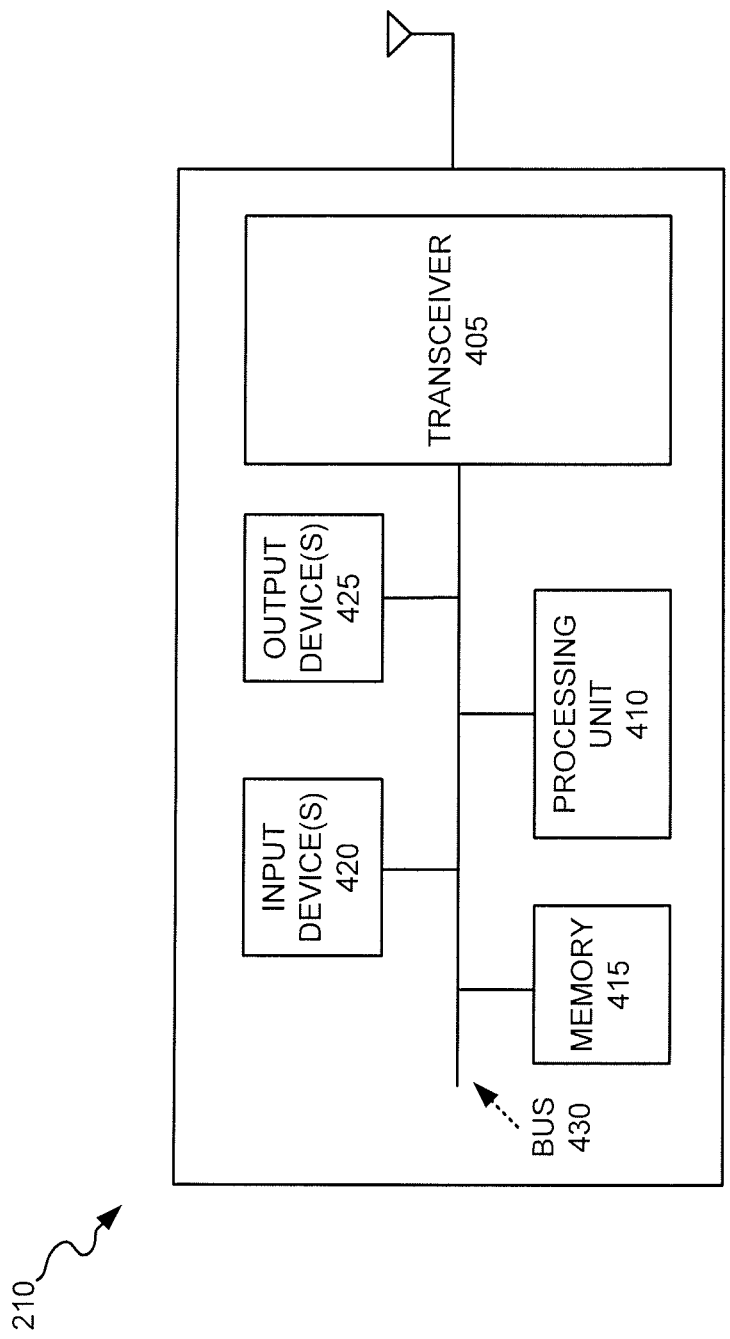
FIG. 4A illustrates exemplary components of the UE of FIG. 2.

FIG. 4A illustrates UE device 210 consistent with an exemplary embodiment. Device 240 may be similarly configured. UE 210 may include a transceiver 405, a processing unit 410, a memory 415, an input device(s) 420, an output device(s) 425, and a bus 430. Transceiver 405 may include transceiver circuitry for transmitting and/or receiving symbol sequences using radio frequency signals via one or more antennas (not shown). Processing unit 410 may include a processor, microprocessor, or processing logic that may interpret and execute instructions. Processing unit 410 may perform all data processing functions for inputting, outputting, and processing of data including data buffering and device control functions, such as call processing control, user interface control, or the like.

Memory 415 may provide permanent, semi-permanent, or temporary working storage of data and instructions for use by processing unit 410 in performing device processing functions. Memory 415 may include read only memory (ROM), random access memory (RAM), large-capacity storage devices, such as a magnetic and/or optical recording medium and its corresponding drive, and/or other types of memory devices. Input device(s) 420 may include mechanisms for entry of data into UE 210. For example, input device(s) 420 may include a key pad (not shown), a microphone (not shown) or a touch-screen display unit (not shown). The key pad may permit manual user entry of data into UE 210. The microphone may include mechanisms for converting auditory input into electrical signals. The display unit may include a screen display that may provide a user interface (e.g., a graphical user interface) that can be used by a user for selecting device functions. The screen display of the display unit may include any type of visual display, such as, for example, a liquid crystal display (LCD), a plasma screen display, a light-emitting diode (LED) display, a cathode ray tube (CRT) display, an organic light-emitting diode (OLED) display, etc.

Output device(s) 425 may include mechanisms for outputting data in audio, video and/or hard copy format. For example, output device(s) 425 may include a speaker (not shown) that includes mechanisms for converting electrical signals into auditory output. Output device(s) 425 may further include a display unit that displays output data to the user. For example, the display unit may provide a graphical user interface that displays output data to the user. Bus 430 may interconnect the various components of UE 210 to permit the components to communicate with one another.

The configuration of components of UE 210 illustrated in FIG. 4A is for illustrative purposes only. Other configurations with more, fewer, or a different arrangement of components may be implemented.

Figure 4B:
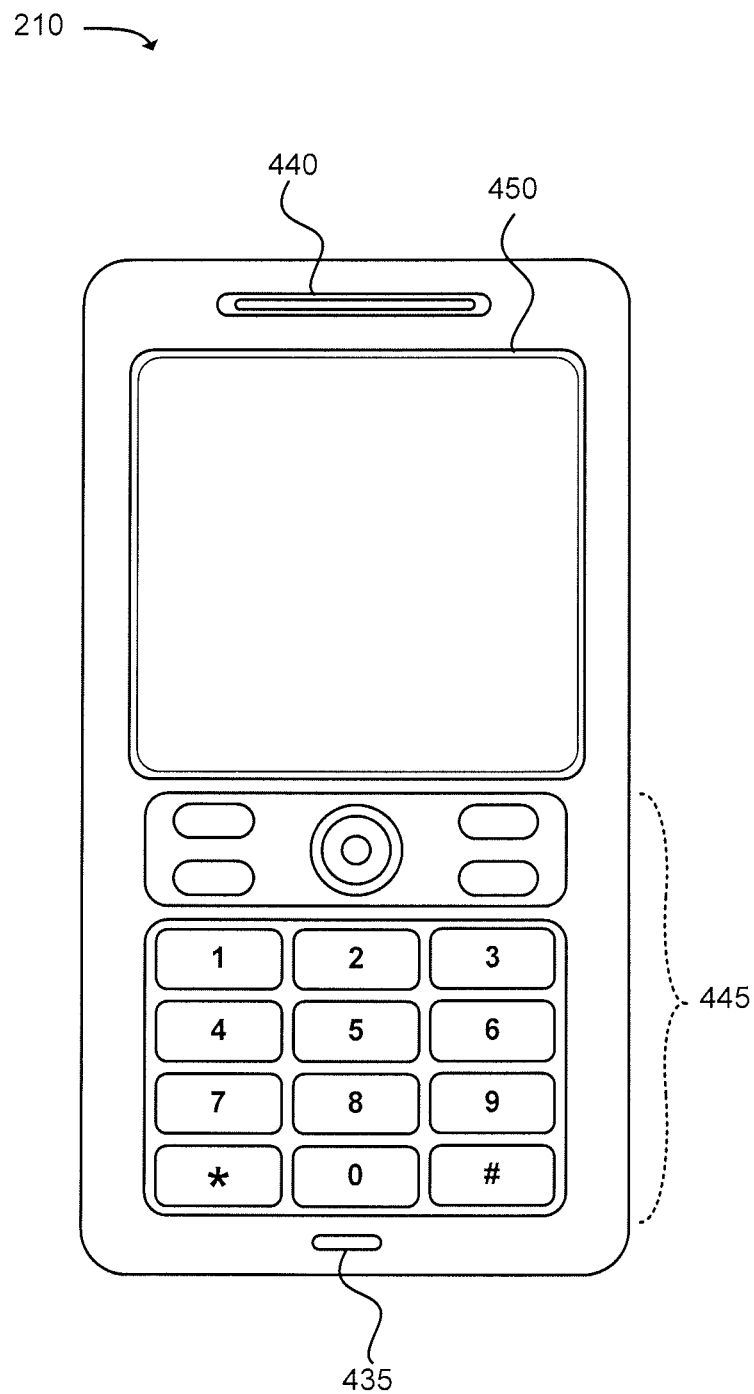
FIG. 4B illustrates an exemplary implementation of the UE of FIG. 2 where the device includes a cellular radiotelephone.

FIG. 4B illustrates an exemplary implementation of UE 210 in which UE 210 includes a cellular radiotelephone. As shown in FIG. 4B, the cellular radiotelephone may include a microphone 435 (e.g., of input device(s) 420) for entering audio information into UE 210, a speaker 440 (e.g., of output device(s) 425) for providing an audio output from UE 210, a keypad 445 (e.g., of input device(s) 420) for manual entry of data or selection of device functions, and a display 450 (e.g., of input device(s) 420 or output device(s) 425) that may visually display data to the user and/or which may provide a user interface that the user may use to enter data or to select device functions (in conjunction with keypad 445).

Figure 5:
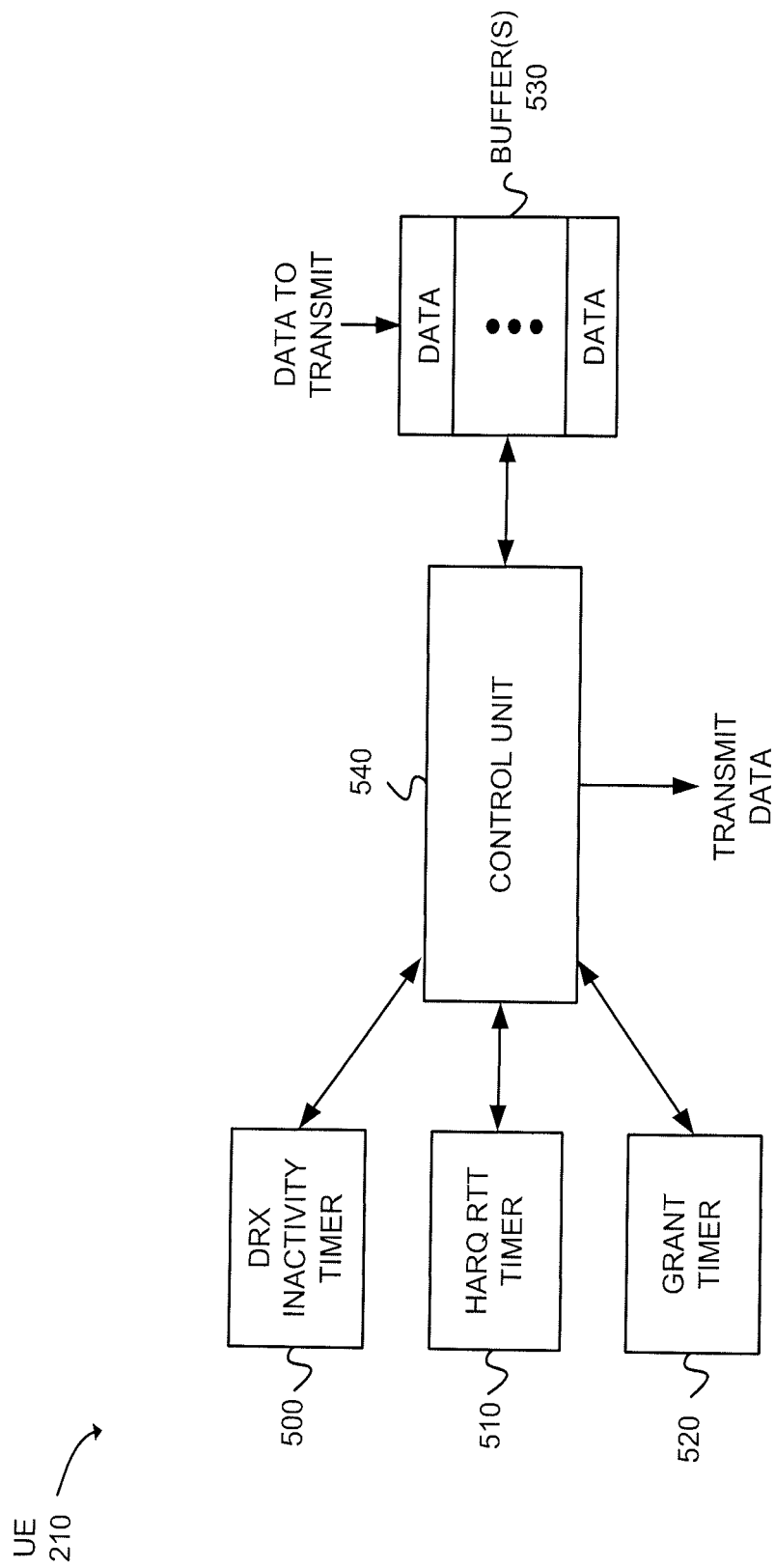
FIG. 5 illustrates exemplary functional components of the UE of FIG. 2.

FIG. 5 illustrates an exemplary functional diagram of UE 210. As shown in FIG. 5, UE 210 may include a DRX inactivity timer 500, a HARQ RTT timer 510, a grant timer 520, one or more buffers 530 and a control unit 540.

DRX inactivity timer 500 may include timing logic that may specify a number of consecutive transmission time intervals (TTIs) during which UE 210 may monitor the PDCCH. HARQ RTT timer 510 may include timing logic that may specify a minimum number of TTIs before a downlink HARQ retransmission is expected to be received by UE 210. Grant timer 520 may include timing logic that may specify a number of consecutive TTIs during which UE 210 may monitor the PDCCH for grants for adaptive retransmissions and/or grants for new data. Buffer(s) 530 may store outgoing scheduling requests (SRs), BSRs, and actual outgoing data. Control unit 540 may monitor the TTIs specified by DRX inactivity timer 500, HARQ RTT timer 510 and grant timer 520 to determine appropriate times to monitor the PDCCH for feedback messages (e.g. ACKs or NACKs) and/or to determine appropriate times to retrieve the outgoing SRs, BSRs and actual data from buffer(s) 530 and transmit them to base station 220. Control unit 540 may be implemented by processing unit 410.

The configuration of functional components of UE 210 illustrated in FIG. 5 is for illustrative purposes only. Other configurations with more, fewer, or a different arrangement of functional components may be implemented.

FIG. 6 illustrates one exemplary implementation of base station 220. Base station 220 may include a transceiver 605, a processing unit 610, a memory 615, an interface 620 and a bus 625.

Transceiver 605 may include transceiver circuitry for transmitting and/or receiving symbol sequences using radio frequency signals via one or more antennas (not shown). Processing unit 610 may include a processor, microprocessor, or processing logic that may interpret and execute instructions. Processing unit 610 may perform all device data processing functions. Memory 615 may provide permanent, semi-permanent, or temporary working storage of data and instructions for use by processing unit 610 in performing device processing functions. Memory 615 may include read only memory (ROM), random access memory (RAM), large-capacity storage devices, such as a magnetic and/or optical recording medium and its corresponding drive, and/or other types of memory devices. Interface 620 may include circuitry for interfacing with a link that connects to a BSC (e.g., BSC 305a or BSC 305b). Bus 625 may interconnect the various components of base station 220 to permit the components to communicate with one another.

The configuration of components of base station 220 illustrated in FIG. 6 is for illustrative purposes only. Other configurations with more, fewer, or a different arrangement of components may be implemented.

Figure 7A:
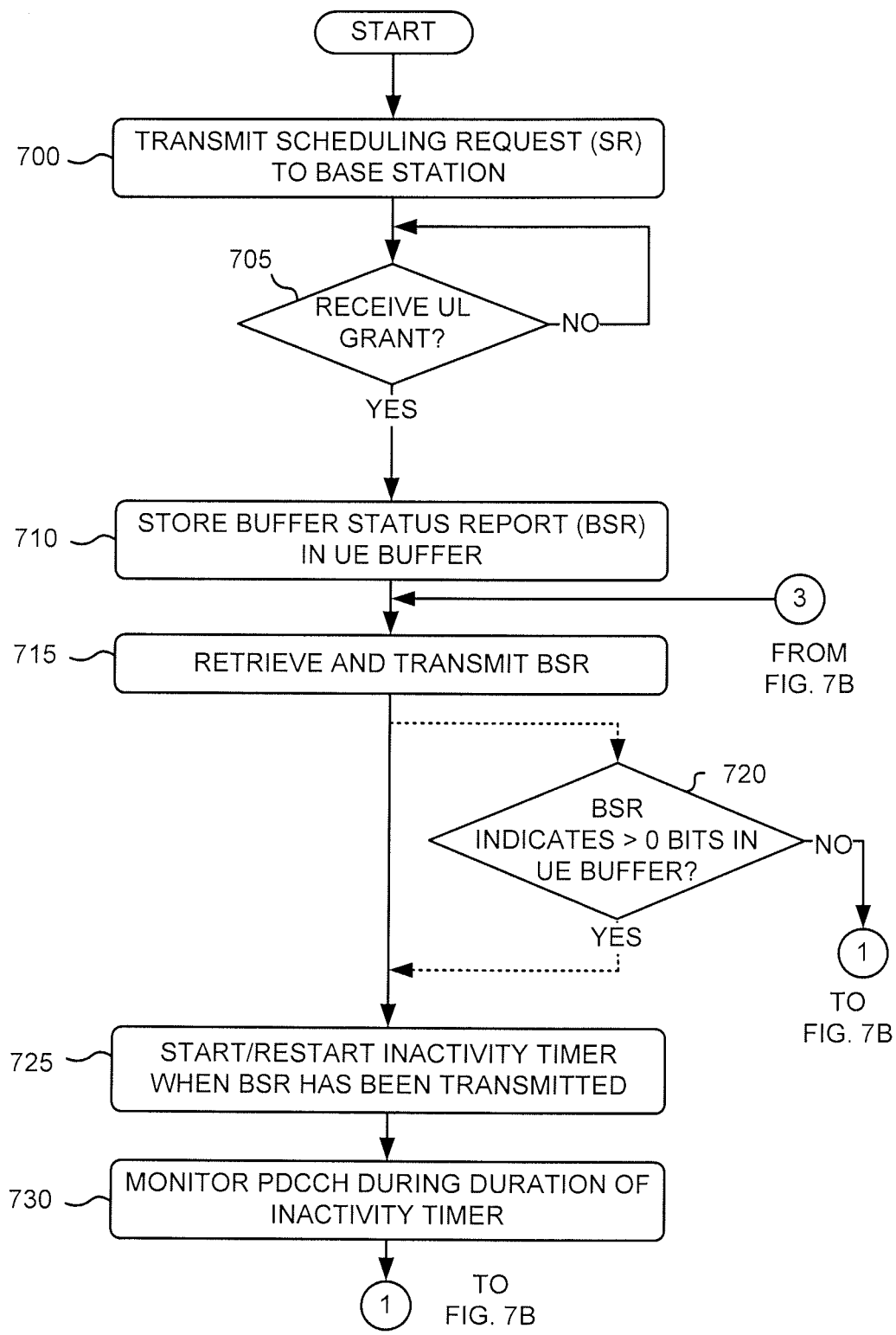
FIGS. 7A and 7B illustrate a flow diagram associated with an exemplary discontinuous reception (DRX) process in which the UE starts/restarts the DRX inactivity timer if the UE transmits or retransmits a data unit that includes a buffer status report (BSR)
Figure 7B:
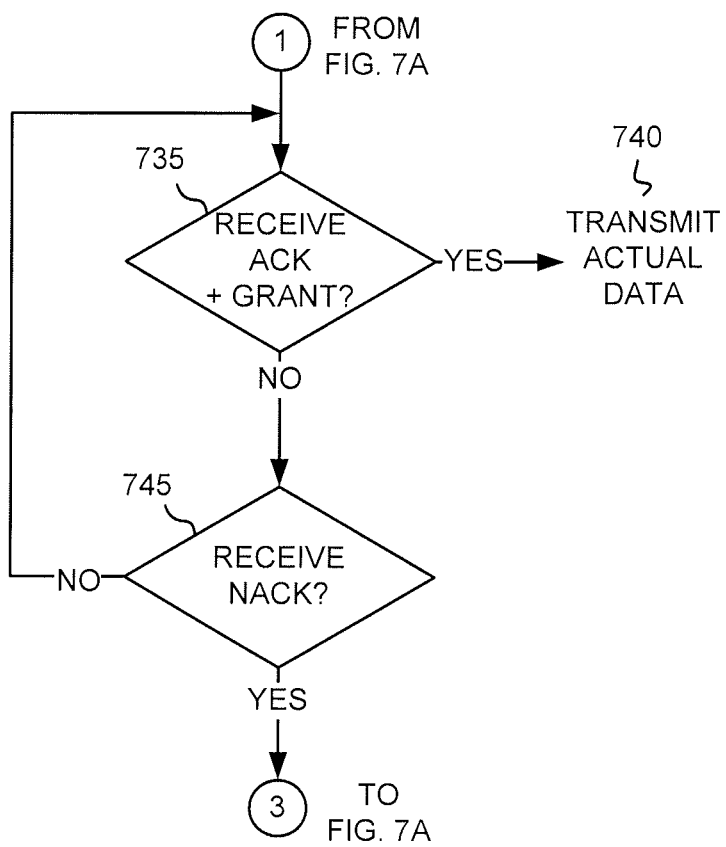

FIGS. 7A and 7B are flowcharts of an exemplary discontinuous reception (DRX) process in which the UE starts/restarts the DRX inactivity timer if the UE transmits or retransmits a data unit that includes a buffer status report (BSR). The exemplary process of FIGS. 7A and 7B may be implemented, for example, by UE 210. In one exemplary implementation, the exemplary process of FIGS. 7A and 7B may be implemented as a set of instructions for execution by control unit 540. In other exemplary implementations, the exemplary process of FIGS. 7A and 7B may be implemented in hardware or in a combination of hardware and software.

Figure 8:
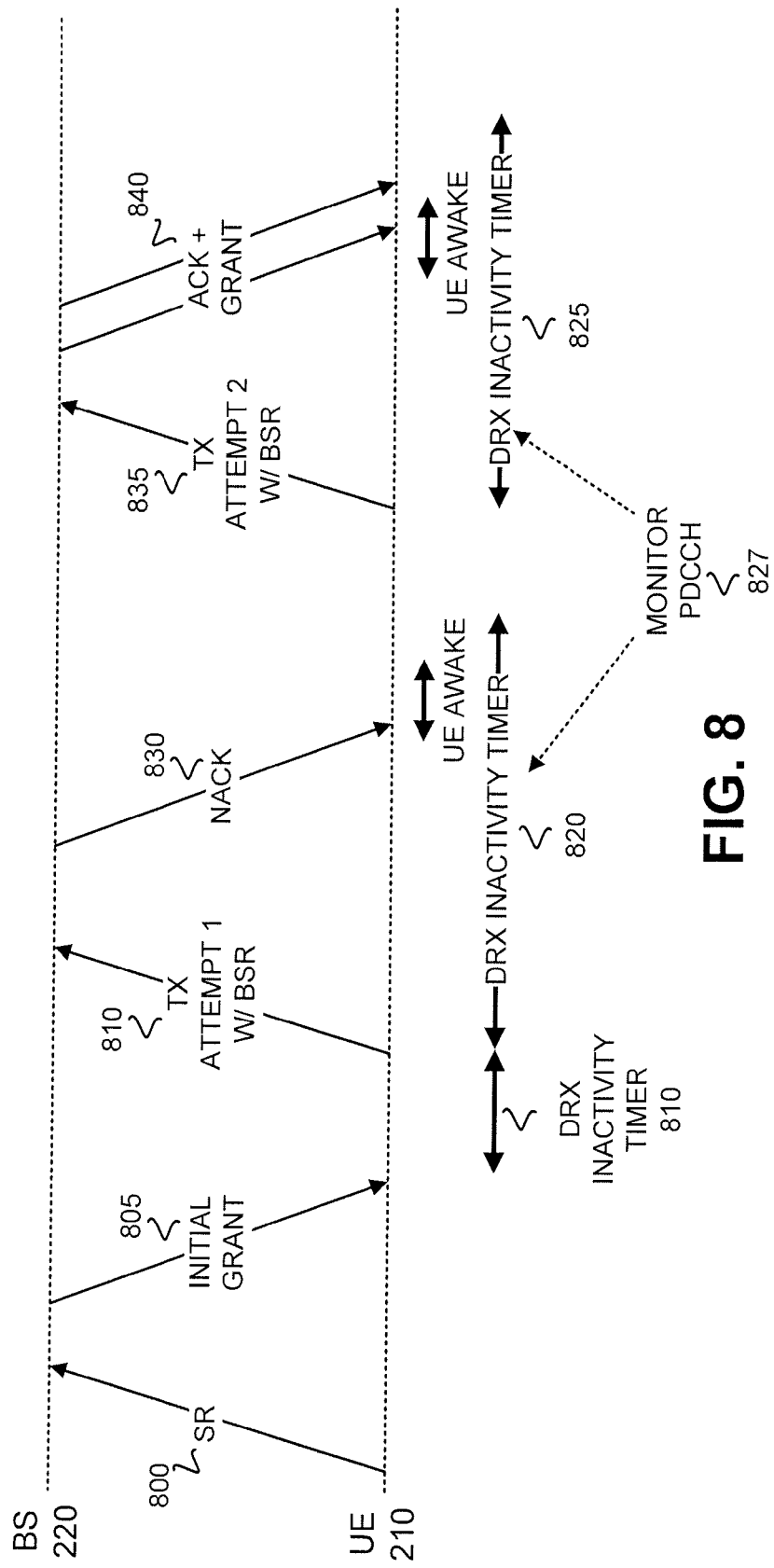
FIG. 8 graphically illustrates an example of the exemplary process of FIGS. 7A and 7B.

The exemplary process may begin with the transmission of a scheduling request (SR) to a serving base station (block 700). In an illustrative example depicted in FIG. 8, UE 210 transmits a SR 800 to BS 220. SR 800 may include data that requests an initial grant from BS 220. A determination may be made whether an uplink (UL) grant has been received from the serving base station (block 705). As shown in FIG. 8, BS 220, in response to receipt of SR 800, may return an initial grant 805 to UE 210. Grant 805 may authorize UE 210 to transmit data, including a BSR 810, to BS 220. If the UL grant has not been received (block 705—NO), then block 705 may repeat until the UL grant is received. If the UL grant has been received, then a buffer status report (BSR) may be stored in the UE buffer (block 710). Control unit 540 of UE 210 may generate a BSR, which indicates a number of bits of actual data stored in buffer(s) 530 awaiting transmission, and may store the BSR in buffer(s) 530. As shown in FIG. 8, the DRX inactivity timer (e.g., DRX inactivity timer 500) may be started 810 upon receipt of initial grant 805. The buffer status report (BSR) may be retrieved from the UE buffer and transmitted (block 715). Control unit 540 of UE 210 may retrieve the BSR from buffer(s) 530 and may initiate the transmission of the BSR to base station 220. As shown in FIG. 8, UE 210 may attempt to transmit the BSR 810 to BS 220.

In one exemplary implementation, the inactivity timer may be started/re-started when the BSR has been transmitted (block 725). Control unit 540 of UE 210 may send control signals to DRX inactivity timer 500 to start/re-start DRX inactivity timer 500 upon transmission of the BSR. As shown in FIG. 8, the DRX inactivity timer may be re-started 820 when the transmission of BSR 810 is attempted. The PDCCH may be monitored during a duration of the inactivity timer (block 730). FIG. 8 depicts UE 210 monitoring 827 the PDCCH during the duration of DRX inactivity timer 820.

In an exemplary alternative implementation, a determination may be made, prior to block 725, of whether the BSR indicates that there are greater than zero bits in the UE buffer (block 720). Control unit 540 may analyze the BSR stored in buffer(s) 530 to determine how many bits of actual data are stored in buffer(s) 530 awaiting transmission. If there are greater than zero bits in the UE buffer (YES—block 720), then the exemplary process may continue at block 725 above.

If the BSR indicates that there are zero bits in the UE buffer (NO—block 720), then the exemplary process may continue at block 735 below.

At block 735, a determination may be made whether an acknowledgement (ACK) and a grant has been received from the base station. If so (YES—block 735), then the actual data may be retrieved from buffer(s) 530 and transmitted 740. BS 220 acknowledges receipt of the BSR from UE 210 by sending the ACK to UE 210 and BS 220 further authorizes UE 210 to transmit an amount of data indicated in the previously transmitted BSR by sending the grant to UE 210.

If the ACK and grant has not been received (NO—block 735), then a determination may be made whether a negative acknowledgement (NACK) has been received (block 745). If so (YES—block 745), then the exemplary process may continue at block 715 of FIG. 7A with the re-transmission of the BSR. FIG. 8 depicts an example in which BS 220 does not receive a BSR subsequent to sending initial grant 805 and, therefore, BS 220 transmits NACK 830 to UE 210 along with a grant authorizing UE 210 to re-transmit the BSR.

If the NACK has not been received (NO—block 745), then the exemplary process may selectively repeat blocks 735 and 745 above until either an ACK and a grant or a NACK have been received. As shown in the example of FIG. 8, subsequent to receipt of NACK 830 from BS 220, UE 210 may attempt again to transmit the BSR 835 to BS 220. In response to receipt of BSR 835, BS 220 may return an ACK and a grant 840 that acknowledges receipt of BSR 835 and which authorizes transmission of the actual data to BS 220.

Figure 9A:
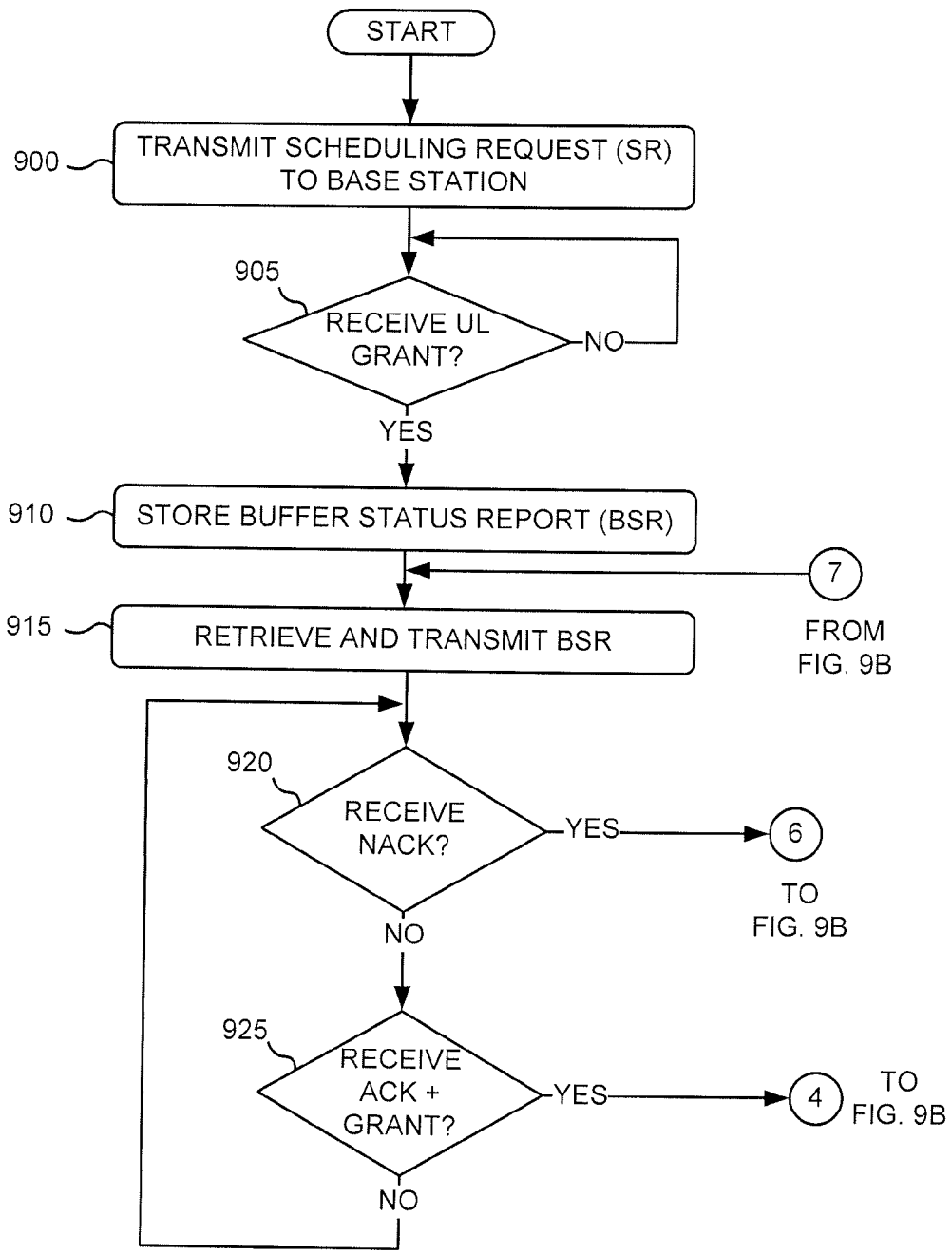
FIGS. 9A and 9B illustrate a flow diagram associated with an exemplary discontinuous reception (DRX) process in which the UE starts/restarts the DRX inactivity timer based on the receipt of an acknowledgement for a previous transmission that included a BSR.
Figure 9B:
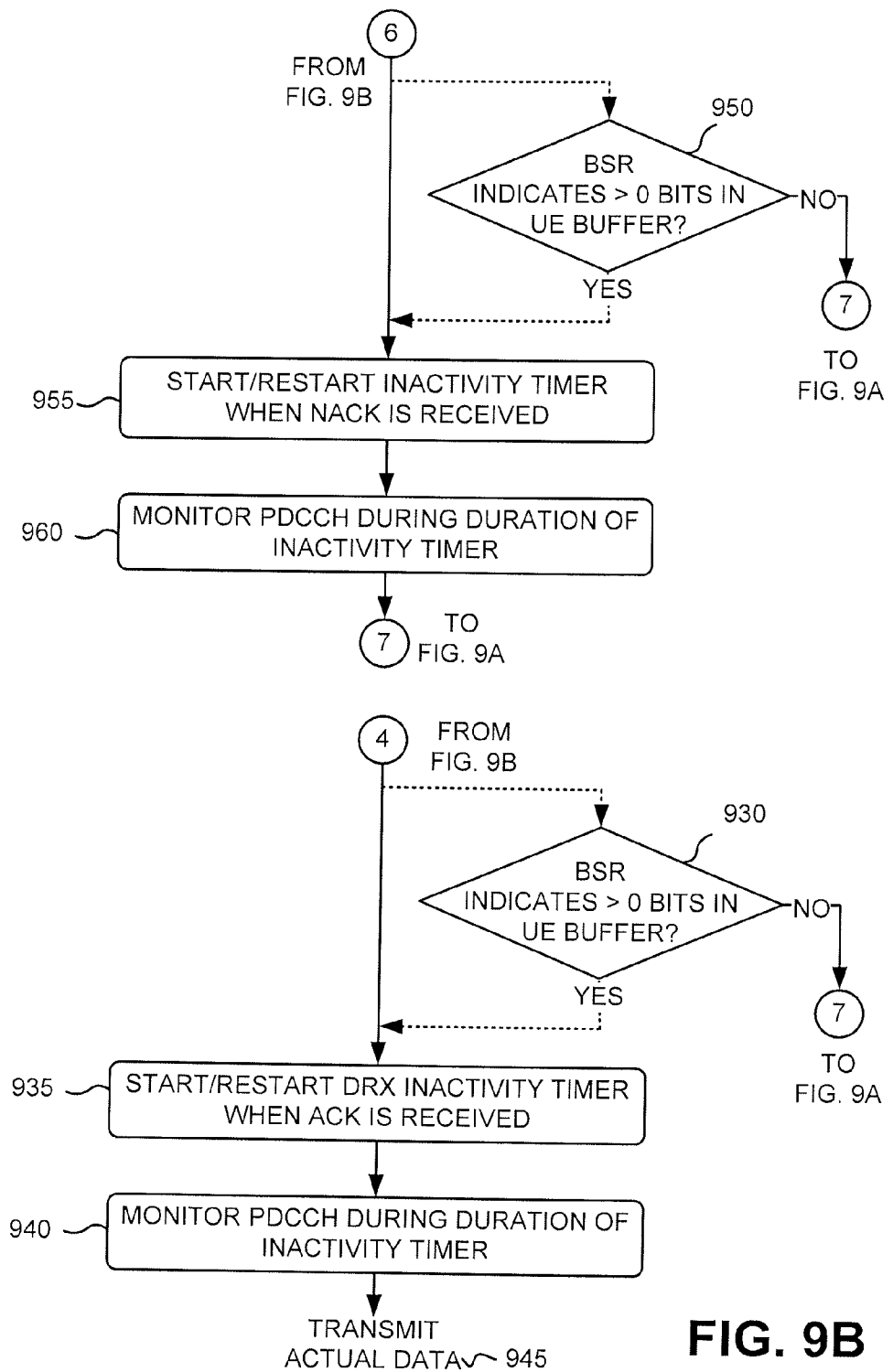

FIGS. 9A and 9B are flowcharts of an exemplary discontinuous reception (DRX) process in which the UE starts/restarts the DRX inactivity timer based on the receipt of an acknowledgement for a previous transmission that included a BSR. The exemplary process of FIGS. 9A and 9B may be implemented, for example, by UE 210. In one exemplary implementation, the exemplary process of FIGS. 9A and 9B may be implemented as a set of instructions for execution by control unit 540. In other exemplary implementations, the exemplary process of FIGS. 9A and 9B may be implemented in hardware or in a combination of hardware and software.

The exemplary process may begin with the transmission of a scheduling request (SR) to the base station (block 900). In an illustrative example depicted in FIG. 10, UE 210 transmits a SR 1000 to BS 220. SR 1000 may include data that requests an initial grant from BS 220.

Figure 10:
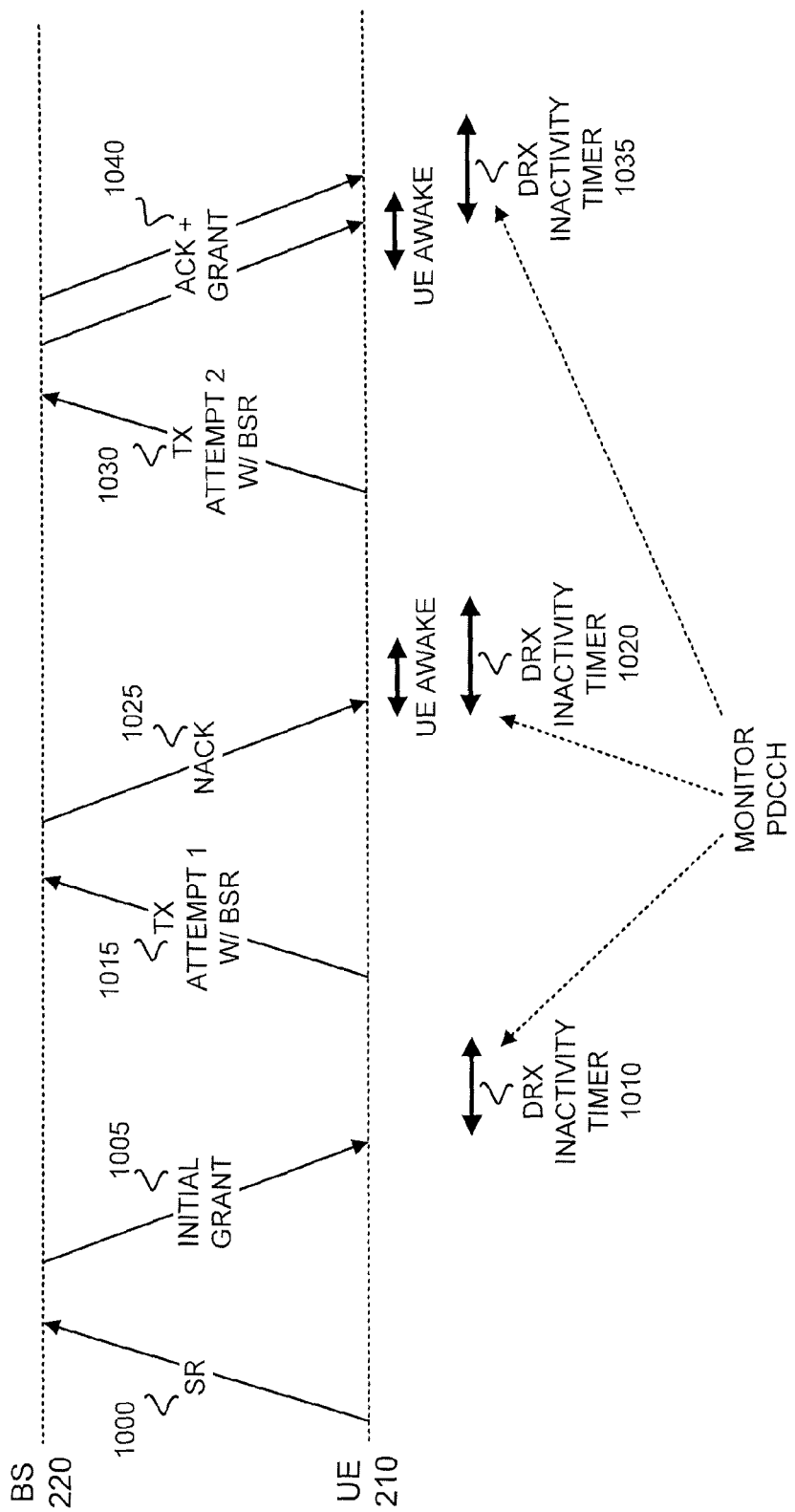
FIG. 10 graphically illustrates an example of the exemplary process of FIGS. 9A and 9B.

A determination may be made whether an uplink (UL) grant has been received (block 905). As shown in FIG. 10, BS 220, in response to receipt of SR 1000, may return an initial grant 1005 to UE 210. Grant 1005 may authorize UE 210 to transmit data, including a BSR, to BS 220. If a UL grant has not been received (NO—block 905), then block 905 may repeat until a UL grant is received. If a UL grant has been received (YES—block 905), then a buffer status report (BSR) may be stored in the UE buffer (block 910). Control unit 540 of UE 210 may generate a BSR, which indicates a number of bits of actual data stored in buffer(s) 530 awaiting transmission, and may store the BSR in buffer(s) 530. As shown in FIG. 10, the DRX inactivity timer may be started 1010 upon receipt of initial grant 1005. The BSR may be retrieved from the UE buffer and transmitted (block 915). Control unit 540 of UE 210 may retrieve the BSR from buffer(s) 530 and may initiate the transmission of the BSR to base station 220. As shown in FIG. 10, UE 210 may attempt to transmit the BSR 1015 to BS 220.

A determination may be made whether a negative acknowledgement (NACK) has been received at UE 210 (block 920).

If so (YES—block 920), then the exemplary process may continue at blocks 955 or 950 below. If a NACK has not been received (NO—block 920), then a determination may be made whether an ACK and a grant have been received at UE 210 (block 925). If so (YES—block 925), then the exemplary process may continue at blocks 935 or 930 below. If the ACK and grant have not been received, then blocks 920 and 925 may repeat until a NACK or ACK is received.

In one exemplary implementation, the DRX inactivity timer may be started/re-started when the NACK is received (block 955). Control unit 540 of UE 210 may send control signals to DRX inactivity timer 500 to start/re-start DRX inactivity timer 500 upon receipt of the BSR NACK. As shown in FIG. 10, a NACK 1025 may be received at UE 210 from BS 220. Upon receipt of NACK 1025, the DRX inactivity timer may be started/re-started 1020. The PDCCH may then be monitored during a duration of the inactivity timer (block 960). FIG. 10 depicts UE 210 monitoring the PDCCH during the duration 1020 of the DRX inactivity timer.

In another exemplary implementation, a determination may be made, prior to block 955, whether the BSR indicates that greater than zero bits are stored in the UE buffer (block 950). If the BSR indicates that there are zero bits in the UE buffer, then the exemplary process may return to block 915 above. If the BSR indicates that there are greater than zero bits in the UE buffer, then the exemplary process may continue at block 955 above.

In a further exemplary implementation, the DRX inactivity timer may be started/re-started when the BSR ACK has been received (block 935). Control unit 540 of UE 210 may send control signals to DRX inactivity timer 500 to start/re-start DRX inactivity timer 500 upon receipt of the BSR ACK. As shown in FIG. 10, an ACK+grant 1040 may be received at UE 210 from BS 220. Upon receipt of ACK+grant 1040, the DRX inactivity timer may be re-started 1035. The PDCCH may then be monitored during a duration of the inactivity timer (block 940). FIG. 10 depicts UE 210 monitoring the PDCCH during the duration of DRX inactivity timer 820.

In yet another exemplary implementation, a determination may be made, prior to block 935, whether the BSR indicates that greater than zero bits are stored in the UE buffer (block 930). If the BSR indicates that there are zero bits in the UE buffer, then the exemplary process may return to block 915 above. If the BSR indicates that there are greater than zero bits in the UE buffer, then the exemplary process may continue at block 935 above.

Figure 11A:
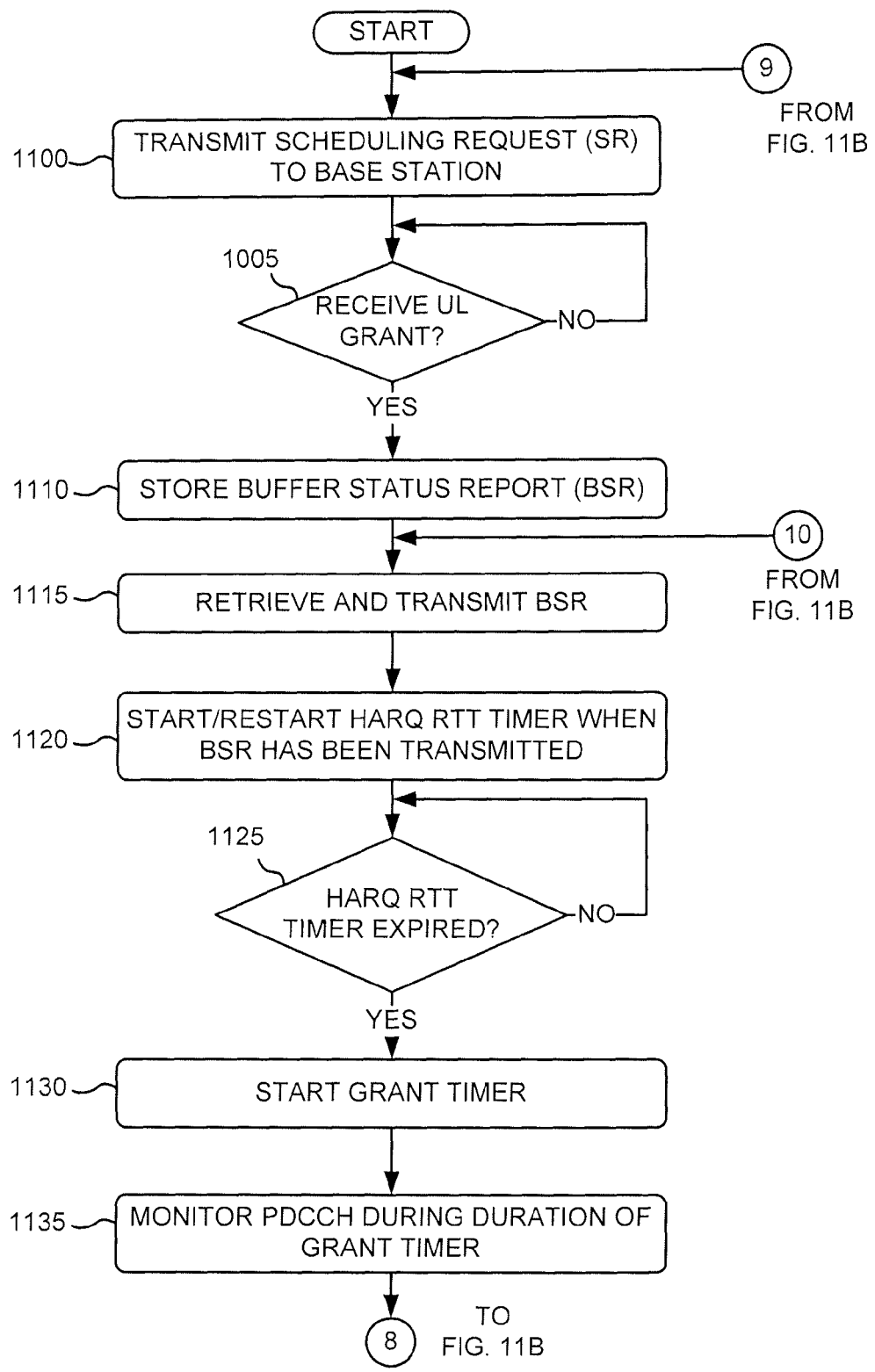
FIGS. 11A and 11B illustrate a flow diagram associated with an exemplary DRX process in which the UE starts/restarts the HARQ RTT timer and a grant timer based on the UE transmitting or retransmitting a data unit that includes a buffer status report (BSR)
Figure 11B:
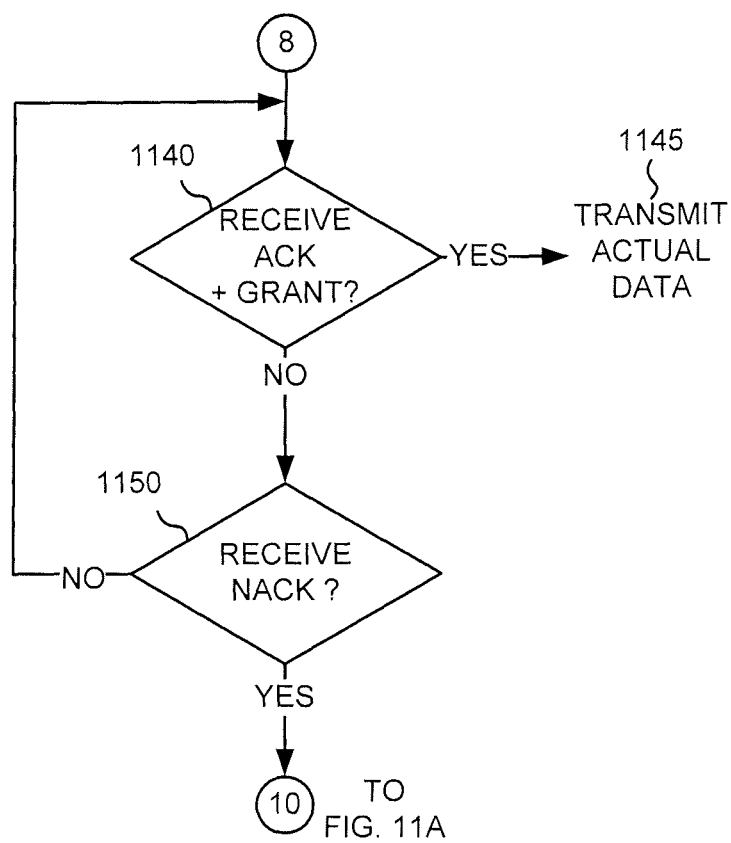

FIGS. 11A and 11B are flowcharts of an exemplary DRX process in which the UE starts/restarts the HARQ RTT timer and a grant timer based on the UE transmitting or retransmitting a data unit that includes a buffer status report (BSR). The exemplary process of FIGS. 11A and 11B may be implemented, for example, by UE 210. In one exemplary implementation, the exemplary process of FIGS. 11A and 11B may be implemented as a set of instructions for execution by control unit 540. In other exemplary implementations, the exemplary process of FIGS. 11A and 11B may be implemented in hardware or in a combination of hardware and software.

The exemplary process may begin the transmission of a scheduling request (SR) from the UE to the base station (block 1100). In an illustrative example depicted in FIG. 12, UE 210 transmits a SR 1200 to BS 220. SR 1200 may include data that requests an initial grant from BS 220.

Figure 12:
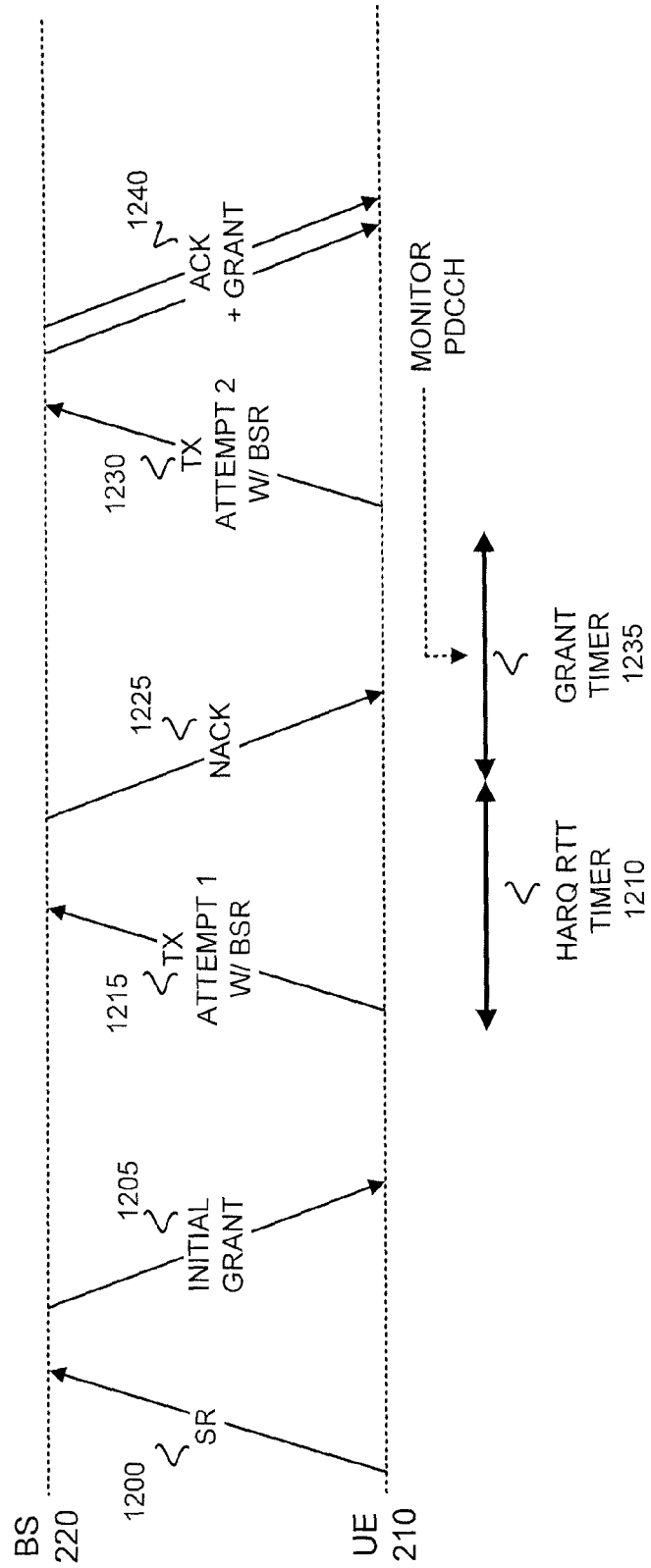
FIG. 12 graphically illustrates an example of the exemplary process of FIGS. 11A and 11B.

A determination may be made whether a UL grant has been received (block 1105). As shown in FIG. 12, BS 220, in response to receipt of SR 1200, may return an initial grant 1205 to UE 210. Grant 1205 may authorize UE 210 to transmit data, including a BSR, to BS 220. If no UL grant is received (NO—block 1105), then block 1105 may repeat until a UL grant is received. If the UL grant is received (YES—block 1105), then the BSR may be stored in the UE buffer (block 1110). Control unit 540 of UE 210 may generate a BSR, which indicates a number of bits of actual data stored in buffer(s) 530 awaiting transmission, and may store the BSR in buffer(s) 530.

The BSR may be retrieved from the UE buffer and transmitted (block 1115). Control unit 540 of UE 210 may retrieve the BSR from buffer(s) 530 and may initiate the transmission of the BSR to base station 220. As shown in FIG. 12, UE 210 may attempt to transmit the BSR 1215 to BS 220.

The HARQ RTT timer may be started/re-started when the BSR has been transmitted (block 1120). Control unit 540 of UE 210 may start/re-start the TTI timer value maintained by HARQ RTT timer 510. As shown in FIG. 12, the HARQ RTT timer may be started/re-started 1210 at the transmission attempt 1215 of the BSR.

A determination may then be made whether the HARQ RTT timer has expired (block 1125). Control unit 540 of UE 210 may monitor the TTI timer value maintained by HARQ RTT timer 510 to identify when the timer has expired. If the HARQ RTT timer has not expired, block 1125 may repeat until the HARQ RTT timer has expired. When the HARQ RTT timer expires (YES—block 1125), the grant timer may be started (block 1130). Control unit 540 may send control signals to start grant timer 520. FIG. 12 depicts the grant timer being started upon expiration of the duration 1210 of the HARQ RTT timer. The PDCCH may then be monitored during a duration of the grant timer (block 1135). FIG. 12 depicts UE 210 monitoring the PDCCH during the duration 1235 of the grant timer.

During the monitoring of the PDCCH, a determination may be made whether an ACK and a grant are received from the base station (block 1140). If so (YES—block 1140), then the actual data may be transmitted 1145 to the base station. Control unit 540 may retrieve the data from buffer(s) 530 and may transmit the data to base station 220.

If an ACK and a grant are not received from the base station (NO—block 1140), then a determination may be made whether a NACK is received from the base station (block 1150). If not (NO—block 1150), then the exemplary process may return to block 1140. If a NACK is received from the base station (YES—block 1150), then the exemplary process may continue at block 1115 (FIG. 11A).

The foregoing description of implementations provides illustration and description, but is not intended to be exhaustive or to limit the invention to the precise form disclosed. Modifications and variations are possible in light of the above teachings, or may be acquired from practice of the invention. For example, while series of blocks have been described with regard to FIGS. 7A, 7B, 9A, 9B, 11 and 11B, the order of the blocks may be modified in other implementations consistent with the principles of the invention. Further, non-dependent blocks may be performed in parallel.

Aspects of the invention may also be implemented in methods and/or computer program products. Accordingly, the invention may be embodied in hardware and/or in hardware/software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement embodiments described herein is not limiting of the invention. Thus, the operation and behavior of the aspects were described without reference to the specific software code—it being understood that one would be able to design software and control hardware to implement the aspects based on the description herein.

Furthermore, certain portions of the invention may be implemented as "logic" that performs one or more functions. This logic may include hardware, such as an application specific integrated circuit or field programmable gate array or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A user equipment (UE) comprising:
   a buffer that stores data for transmission; and
   a control unit configured to,
      receive a grant from a base station permitting the UE to transmit data to the base station,
      initiate transmission of the data to the base station, where the data includes a buffer status report (BSR) that indicates an amount of data in the buffer,
      start a process specific hybrid automatic repeat request (HARQ) round trip time (RTT) timer upon transmission of the data including the BSR,
      start a grant timer when the HARQ RTT timer expires, and
      monitor a control channel during a duration of the grant timer.

2. The user equipment of claim 1, where the control channel comprises a Physical Downlink Control Channel (PDCCH).

3. The user equipment of claim 1, where the BSR comprises a periodic BSR.

4. A method implemented in a user equipment (UE), the method comprising:
   storing data in a buffer for transmission;
   receiving a grant from a base station permitting the UE to transmit data to the base station;
   initiating transmission of the data to the base station, where the data includes a buffer status report (BSR) that indicates an amount of data in the buffer;
   starting a process specific hybrid automatic repeat request (HARQ) round trip time (RTT) timer upon transmission of the data including the BSR;
   starting a grant timer when the HARQ RTT timer expires; and
   monitoring a control channel during a duration of the grant timer.

5. The method of claim 4, where the control channel comprises a Physical Downlink Control Channel (PDCCH).

6. The method of claim 4, where the BSR comprises a periodic BSR.

* * * * *

UNITED STATES PATENT AND TRADEMARK OFFICE
CERTIFICATE OF CORRECTION

PATENT NO. : 8,462,803 B2
APPLICATION NO. : 12/936100
DATED : June 11, 2013
INVENTOR(S) : Susitaival et al.

Page 1 of 1

It is certified that error appears in the above-identified patent and that said Letters Patent is hereby corrected as shown below:

On Title Page 2, Item (56), under "OTHER PUBLICATIONS", in Column 2, Line 16, delete "Engish" and insert -- English --, therefor.

In the Specification

In Column 7, Line 44, delete "810" and insert -- BSR 810 --, therefor.

In the Claims

In Column 12, Line 2, in Claim 1, delete "(B SR)" and insert -- (BSR) --, therefor.

Signed and Sealed this
Thirteenth Day of May, 2014

Michelle K. Lee
*Deputy Director of the United States Patent and Trademark Office*